US011891935B1

(12) United States Patent
Joh et al.

(10) Patent No.: US 11,891,935 B1
(45) Date of Patent: Feb. 6, 2024

(54) EXHAUST GAS PURIFICATION APPARATUS

(71) Applicant: HONDA MOTOR CO., LTD., Tokyo (JP)

(72) Inventors: Yuichiro Joh, Saitama (JP); Takeshi Ueno, Saitama (JP); Taiki Katayama, Saitama (JP); Haruya Kitano, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 18/322,590

(22) Filed: May 24, 2023

(51) Int. Cl.

| | |
|---|---|
| ***F01N 3/20*** | (2006.01) |
| ***F01N 3/38*** | (2006.01) |
| ***F02D 41/02*** | (2006.01) |
| ***F01N 3/36*** | (2006.01) |
| *F02D 41/38* | (2006.01) |
| *F02P 5/15* | (2006.01) |
| *F02D 41/00* | (2006.01) |

(52) U.S. Cl.

CPC ............. *F01N 3/2033* (2013.01); *F01N 3/36* (2013.01); *F01N 3/38* (2013.01); *F02D 41/0255* (2013.01); *F01N 2240/14* (2013.01); *F01N 2430/06* (2013.01); *F01N 2430/08* (2013.01); *F01N 2430/085* (2013.01); *F01N 2430/10* (2013.01); *F01N 2900/0422* (2013.01); *F01N 2900/1824* (2013.01); *F02D 41/0205* (2013.01); *F02D 2041/002* (2013.01); *F02D 2041/389* (2013.01); *F02P 5/1506* (2013.01)

(58) Field of Classification Search

CPC . F01N 3/2033; F01N 3/36; F01N 3/38; F01N 2240/14; F01N 2430/06; F01N 2430/08; F01N 2430/085; F01N 2430/10; F01N 2900/0422; F01N 2900/1824; F02D 2041/002; F02D 41/0205; F02D 41/0255; F02D 2041/389; F02P 5/1506

USPC .......... 60/284, 285, 286, 290, 300, 303, 320

See application file for complete search history.

(56) References Cited

U.S. PATENT DOCUMENTS

| | | | | |
|---|---|---|---|---|
| 2013/0186071 | A1* | 7/2013 | Mori | F01N 9/002 60/274 |
| 2023/0003156 | A1* | 1/2023 | De Cesare | F01N 3/36 |

FOREIGN PATENT DOCUMENTS

| | | | | |
|---|---|---|---|---|
| CN | 111997719 A | * 11/2020 | | F01N 3/2033 |
| JP | 2001123825 A | 5/2001 | | |

* cited by examiner

*Primary Examiner* — Jorge L Leon, Jr.
(74) *Attorney, Agent, or Firm* — CKC & PARTNERS CO., LLC

(57) ABSTRACT

An exhaust gas purification apparatus includes: a catalyst device that is provided in an exhaust passage of an internal combustion engine; an exhaust ignition device that is provided upstream of the exhaust passage from the catalyst device; and a controller that controls a treatment of heating the catalyst device by adjusting supply of the air-fuel mixture to a region of the exhaust passage where the exhaust ignition device is provided and ignition of the air-fuel mixture by the exhaust ignition device, the controller includes an equivalence ratio setting unit that sets a target value of an equivalence ratio of the air-fuel mixture to a first equivalence ratio larger than 1 until a predetermined first time elapses from a start of supply of the fuel and sets the target value of the equivalence ratio of the air-fuel mixture to a second equivalence ratio smaller than 1 after the first time elapses.

19 Claims, 5 Drawing Sheets

EXHAUST GAS PURIFICATION APPARATUS

BACKGROUND OF THE INVENTION

Field of the Invention

The present invention relates to an exhaust gas purification apparatus for an internal combustion engine.

Related Art

Efforts aimed at mitigation or impact reduction of climate change have been continued from the past, and research and development for improvement of emissions are being carried out toward realization. Generally, four-wheel internal combustion engines utilize a catalyst device to remove air pollutants from emissions. Since the catalyst device cannot exhibit sufficient effects when a temperature of a catalyst is low, the amount of air pollutants to be emitted during cold start is relatively large. Therefore, it is necessary to reduce the amount of air pollutants to be emitted during cold start in order to reduce an environmental load. From such a viewpoint, a technique has been proposed in which an air-fuel mixture is burned beforehand in an exhaust passage during cold start of an internal combustion engine to heat a catalyst device, thereby activating a catalyst and reducing the amount of air pollutants to be emitted (for example, see Japanese Unexamined Patent Application, Publication No. 2001-123825).

SUMMARY OF THE INVENTION

By the way, since the amount of air pollutants to be emitted during heating of the catalyst device cannot also be ignored in the improvement of emissions, it is also necessary to reduce the amount of air pollutants to be emitted during heating of the catalyst device. In the technique disclosed in Japanese Unexamined Patent Application, Publication No. 2001-123825, there are attempts to improve stability of ignition and combustion, but sufficient consideration is not given to the amount of air pollutants to be emitted during heating of the catalyst device. It is an object of the present application invention to reduce the amount of air pollutants to be emitted during heating of the catalyst device in order to solve the above-described problems. Furthermore, the present application invention contributes to mitigation or impact reduction of climate change.

The inventors of the present invention have found a way capable of reducing the amount of air pollutants to be emitted during heating of the catalyst device by controlling the combustion of the air-fuel mixture in the exhaust passage in more detail, and complete the present invention. The present invention relates to exhaust gas purification apparatus of (1) to (18) below.

(1) An exhaust gas purification apparatus including: a catalyst device that is provided in an exhaust passage of an internal combustion engine and purifies exhaust gas of the internal combustion engine; an exhaust ignition device that is provided upstream of the exhaust passage from the catalyst device and ignites an air-fuel mixture of fuel and combustion air in the exhaust passage; and a controller that controls a treatment of heating the catalyst device by adjusting supply of the air-fuel mixture to a region of the exhaust passage where the exhaust ignition device is provided and ignition of the air-fuel mixture by the exhaust ignition device, the controller including an equivalence ratio setting unit that sets a target value of an equivalence ratio of the air-fuel mixture to a first equivalence ratio larger than 1 until a predetermined first time elapses from a start of supply of the fuel and sets the target value of the equivalence ratio of the air-fuel mixture to a second equivalence ratio smaller than 1 after the first time elapses.

According to the invention of (1), the generation of air pollutants at the time of ignition is reduced by ignition with a fuel-rich (hereinafter, simply referred to as rich) air-fuel mixture, and the generation of air pollutants is reduced by combustion with a fuel-lean (hereinafter, simply referred to as lean) air-fuel mixture after the combustion is stabilized. Thus, it is possible to reduce the amount of air pollutants to be emitted when the catalyst device is heated.

(2) In the exhaust gas purification apparatus according to (1), the equivalence ratio setting unit sets the target value of the equivalence ratio of the air-fuel mixture to a third equivalence ratio, which is smaller than 1 and larger than the second equivalence ratio, when a predetermined second time elapses from the start of supply of the fuel.

According to the invention of (2), a rich air-fuel mixture capable of reducing the generation of air pollutants is supplied to the exhaust passage at the time of ignition, and the air-fuel mixture being primarily large lean is supplied after the ignition, thereby the equivalence ratio of the air-fuel mixture in the exhaust passage can be lowered to the extent that the generation of air pollutants can be reduced during the continuous combustion, the flame propagation velocity can be reduced, and misfiring can be prevented. After an equivalence ratio of an air-fuel mixture in the exhaust passage is lowered, a slightly lean air-fuel mixture capable of reducing the generation of air pollutants during the continuous combustion is supplied, and thus stable and low-emission combustion can be continued. By the control of the equivalence ratio in three stages in this way, it is possible to prevent misfiring and reduce air pollutants without any additional configuration.

(3) In the exhaust gas purification apparatus according to (2), the second equivalence ratio is an equivalence ratio equal to or lower than a misfiring limit, and the third equivalence ratio is an equivalence ratio equal to or higher than the misfiring limit.

According to the invention of (3), When the equivalence ratio is made equal to or lower than the misfiring limit after ignition, the equivalence ratio of the air-fuel mixture in the exhaust passage can be lowered, and thus it is possible to prevent the air-fuel mixture from becoming excessively rich in fuel and to prevent misfiring caused by a backflow of flame. Further, after the equivalence ratio of the air-fuel mixture in the exhaust passage is lowered to 1 (stoichiometry: theoretical air-fuel ratio) or less by the supply of the air-fuel mixture equal to or lower than the misfiring limit, a moderately lean air-fuel mixture equal to or higher than the misfiring limit is supplied, and thus the emission of air pollutants can be effectively reduced.

(4) In the exhaust gas purification apparatus according to (1), the first time is a time during which the air-fuel mixture set to the first equivalence ratio is able to reach the exhaust ignition device.

According to the invention of (4) above, the equivalence ratio can be appropriately switched from the first equivalence ratio to the second equivalence ratio.

(5) In the exhaust gas purification apparatus according to (2), the second time is a time during which the equivalence ratio of the air-fuel mixture at an upstream tip of a flame due to combustion of the air-fuel mixture is able to be smaller than 1.

According to the invention of (5), the equivalence ratio can be appropriately switched from the second equivalence ratio to the third equivalence ratio.

(6) In the exhaust gas purification apparatus according to (1), the controller includes an exhaust ignition control unit that stops an ignition operation of the exhaust ignition device after flame is caused by combustion of the air-fuel mixture.

According to the invention of (6), it is possible to reduce electric power required to operate the ignition device, in addition to the reduction of air pollutants at the time of ignition.

(7) In the exhaust gas purification apparatus according to (1), the controller includes a fuel supply amount calculation unit that acquires an intake pressure of the internal combustion engine and calculates, based on the acquired intake pressure, the supply amount of the fuel required to set the equivalence ratio of the air-fuel mixture to the target value.

According to the invention of (7), the equivalence ratio can be appropriately controlled with a simple configuration.

(8) In the exhaust gas purification apparatus according to (1), the controller includes a motor control unit that supplies the combustion air to the exhaust passage through a cylinder of the internal combustion engine by causing an electric motor to drive a crankshaft of the internal combustion engine during the treatment of heating the catalyst device.

According to the invention of (8), the combustion air can be efficiently sent into the exhaust passage (9) In the exhaust gas purification apparatus according to (8), the controller includes a cylinder ignition control unit that controls an operation timing of a cylinder ignition device of the internal combustion engine such that the air-fuel mixture is not burned in the cylinder.

According to the invention of (9), it is possible to prevent deterioration of the ignition plug of the cylinder ignition device during the heating treatment of the catalyst device.

(10) In the exhaust gas purification apparatus according to (9), the controller includes a fuel injection control unit that causes a fuel injection device of the internal combustion engine to inject the fuel into the cylinder after the cylinder ignition control unit causes the cylinder ignition device to perform an ignition operation.

According to the invention of (10), with a simple configuration in which the fuel is supplied into the cylinder after the ignition of the cylinder ignition device, the air-fuel mixture can be introduced into the exhaust passage without being burned in the cylinder.

(11) In the exhaust gas purification apparatus according to (8), the controller includes a fuel injection control unit that causes a fuel injection device of the internal combustion engine to inject the fuel into the cylinder after the cylinder ignition device of the internal combustion engine performs an ignition operation.

According to the invention of (11), with a simple configuration in which the fuel is supplied into the cylinder after the ignition of the cylinder ignition device, the air-fuel mixture can be introduced into the exhaust passage without being burned in the cylinder.

(12) In the exhaust gas purification apparatus according to (1), the controller includes a throttle control unit that sets an opening degree of a throttle valve of the internal combustion engine to a predetermined initial opening degree when the treatment of heating the catalyst device is started.

According to the invention of (12), when the opening degree of the throttle valve is set to a certain opening degree or more, a negative pressure in the cylinder is reduced, and a moving speed in a backflow direction of the air-fuel mixture is reduced, whereby it is possible to prevent the flame generated by ignition of the air-fuel mixture by the exhaust ignition device from flowing back into the cylinder.

(13) In the exhaust gas purification apparatus according to (12), the throttle control unit makes the opening degree of the throttle valve smaller than the initial opening degree when a predetermined third time elapses from a start of supply of the fuel.

According to the invention of (13), after the behavior of the flame is stabilized, the requirement for backflow prevention is mitigated. The throttle opening degree is made small in this state, and thus a heat load on the catalyst can be reduced.

(14) In the exhaust gas purification apparatus according to (13), the third time is a time until a flame caused by combustion of the air-fuel mixture is stabilized from a start of a treatment of heating the catalyst device.

According to the invention of (14), the heat load on the catalyst can be reduced at appropriate timing.

(15) In the exhaust gas purification apparatus according to (1), the controller includes an intake valve control unit that brings a closure timing of an intake valve of the internal combustion engine closer to a bottom dead center at a start of the treatment of heating the catalyst device.

According to the invention of (15), under the engine operating conditions during the heating treatment of the catalyst device, when the closure timing of the intake valve is brought closer to the bottom dead center, intake air charging efficiency can be increased. When the charging efficiency can be improved in this way, the negative pressure in the cylinder can be reduced, and the backflow of the flame generated in the exhaust passage into the cylinder can be prevented.

(16) In the exhaust gas purification apparatus according to (15), the intake valve control unit causes the closure timing of the intake valve to move away from the bottom dead center when a predetermined third time elapses from a start of supply of the fuel.

According to the invention of (16), since the requirement for backflow prevention is mitigated after the behavior of the flame is stabilized, it is possible to reduce the heat load on the catalyst by moving the closure timing of the intake valve away from the bottom dead center.

(17) In the exhaust gas purification apparatus according to (1), the first equivalence ratio is 3 or larger and 6 or smaller.

According to the invention of (17), when the first equivalence ratio is within the range described above, emissions of air pollutants at the time of ignition can be reduced.

(18) In the exhaust gas purification apparatus according to (1), the second equivalence ratio is smaller than 0.6.

According to the invention of (18), when the second equivalence ratio is within the range described above, the excessively rich state of the air-fuel mixture at the time of ignition can be eliminated, the flame propagation velocity can be greatly reduced, and thus the backflow of the flame into the cylinder can be prevented.

(19) In the exhaust gas purification apparatus according to (2), the third equivalence ratio is 0.6 or larger and 0.9 or smaller.

According to the invention of (19), when the third equivalence ratio is within the range described above, emissions of air pollutants during the continuous combustion after ignition can be reduced.

As described above, according to the configuration of (1) above, it is possible to reduce the amount of air pollutants to be emitted when the catalyst device is heated. Furthermore, according to the configurations of (2) to (19) above citing the configuration of (1) above, additional effects are obtained.

DETAILED DESCRIPTION OF THE INVENTION

An embodiment of the present invention will be described below with reference to the drawings. However, the present invention is not limited to the following embodiment, and can be modified as appropriate without departing from the spirit of the present invention.

Figure 1:
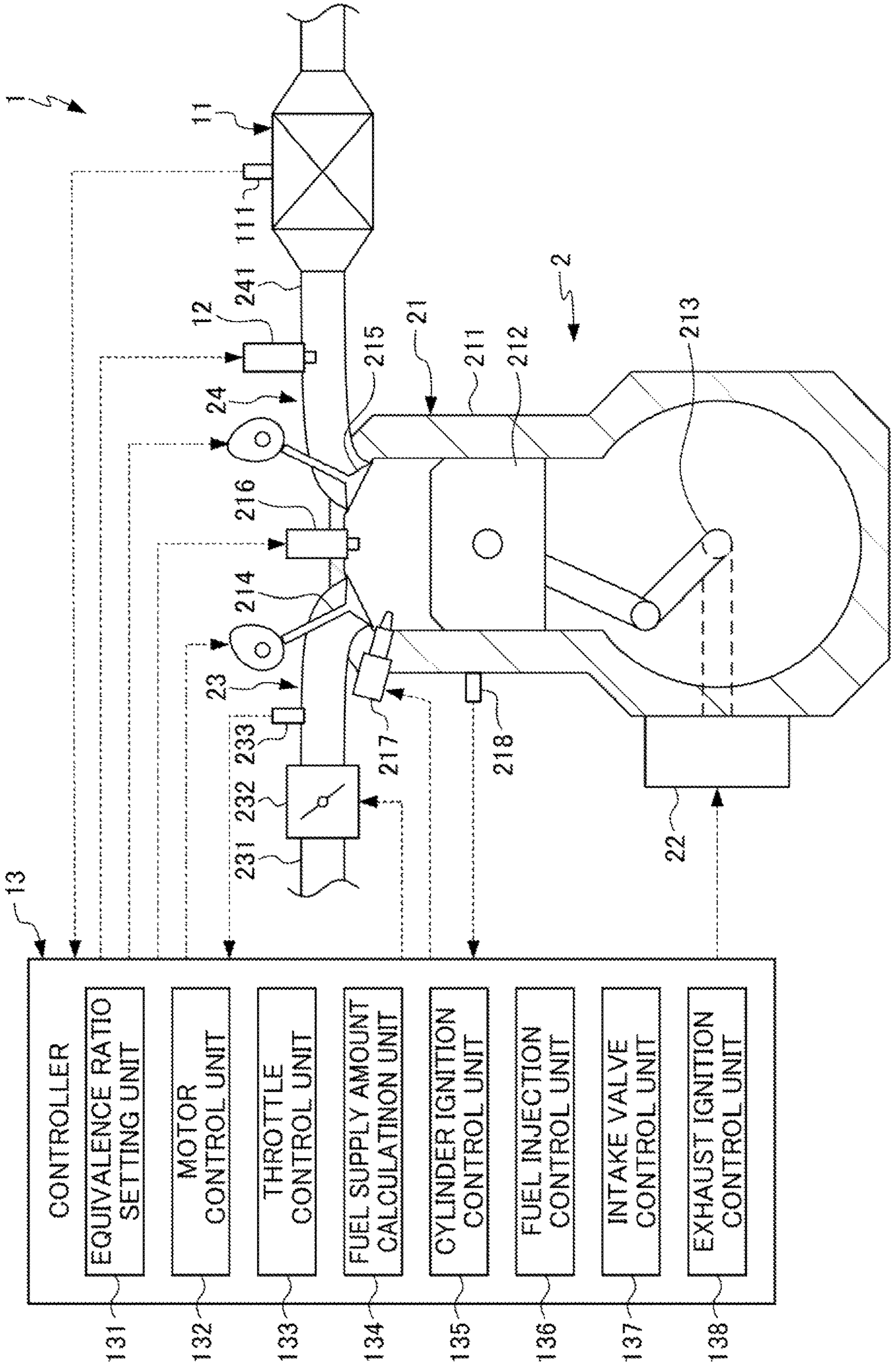
FIG. 1 is a schematic diagram showing a configuration of an exhaust gas purification apparatus according to an embodiment of the present invention.

FIG. 1 is a schematic diagram showing a configuration of an exhaust gas purification apparatus 1 according to an embodiment of the present invention. The exhaust gas purification apparatus 1 is an apparatus that purifies exhaust gas of an internal combustion engine 2.

The internal combustion engine 2 includes an engine body 21, an electric motor 22, an intake system 23, and an exhaust system 24. The engine body 21 may have a known configuration including a cylinder 211, a piston 212, a crankshaft 213, an intake valve 214, an exhaust valve 215, a cylinder ignition device (ignition plug) 216, a fuel injection device (injector) 217, and a cooling water temperature sensor 218. The engine body 21 in FIG. 1 includes a single cylinder 211 and a single piston 212 for convenience of illustration, but the engine body 21 may include a plurality of cylinders 211 and a plurality of pistons 212. The electric motor 22 is provided to be able to rotate the crankshaft 213. The electric motor 22 may be a motor for hybrid engine or a starter motor (starter). The intake system 23 includes an intake passage (intake pipe) 231 through which combustion air is guided into the engine body 21 and a throttle valve 232 provided in the intake passage 231. Furthermore, the intake system 23 may have an intake pressure sensor 233 that detects an intake pressure of the internal combustion engine 2, that is, an internal pressure of the intake passage 231 immediately before the engine body 21. The exhaust system 24 includes an exhaust passage (exhaust pipe) 241 through which an emission (combustion exhaust gas) is led from the engine body 21. The exhaust passage 241 may include a collecting pipe portion that collects emissions from the plurality of cylinders 211.

The exhaust gas purification apparatus 1 includes a catalyst device 11 that purifies exhaust gas of the internal combustion engine 2, an exhaust ignition device 12 that ignites an air-fuel mixture of a fuel and a combustion air in the exhaust passage 241, and a controller 13 that controls a treatment for heating the catalyst device 11 (hereinafter, referred to as catalyst heating treatment).

The catalyst device 11 is provided in the exhaust passage 241 of the internal combustion engine 2. The catalyst device 11 is a device having a known configuration in which pollutants of HC, CO, NOx and the like in emissions are removed with a three-way catalyst, for example. The catalyst device 11 preferably includes a catalyst temperature sensor 111 that detects a temperature of the catalyst.

The exhaust ignition device 12 is provided upstream of the exhaust passage 241 from the catalyst device 11. The exhaust ignition device 12 may be configured with an ignition plug arranged to generate a spark inside the exhaust passage 241.

The controller 13 controls the exhaust gas purification apparatus 1 and the internal combustion engine 2 to execute a catalyst heating treatment. Specifically, the controller 13 adjusts the supply of the air-fuel mixture to a region of the exhaust passage 241 where the exhaust ignition device 12 is provided and the ignition of the air-fuel mixture by the exhaust ignition device 12. The controller 13 can be configured by one or a plurality of computers including a memory, a processor and the like, and functions by executing appropriate programs. Further, the controller 13 may be configured integrally with a controller (not shown, for example, an electronic control unit) of the internal combustion engine 2, or may be configured to cooperate with the controller of the internal combustion engine 2.

The controller 13 includes an equivalence ratio setting unit 131, a motor control unit 132, a throttle control unit 133, a fuel supply amount calculation unit 134, a cylinder ignition control unit 135, a fuel injection control unit 136, an intake valve control unit 137, and an exhaust ignition control unit 138. These components are categorized according to functions of the controller 13, and may not be clearly distinguished in a physical configuration and a program configuration.

Figure 2:
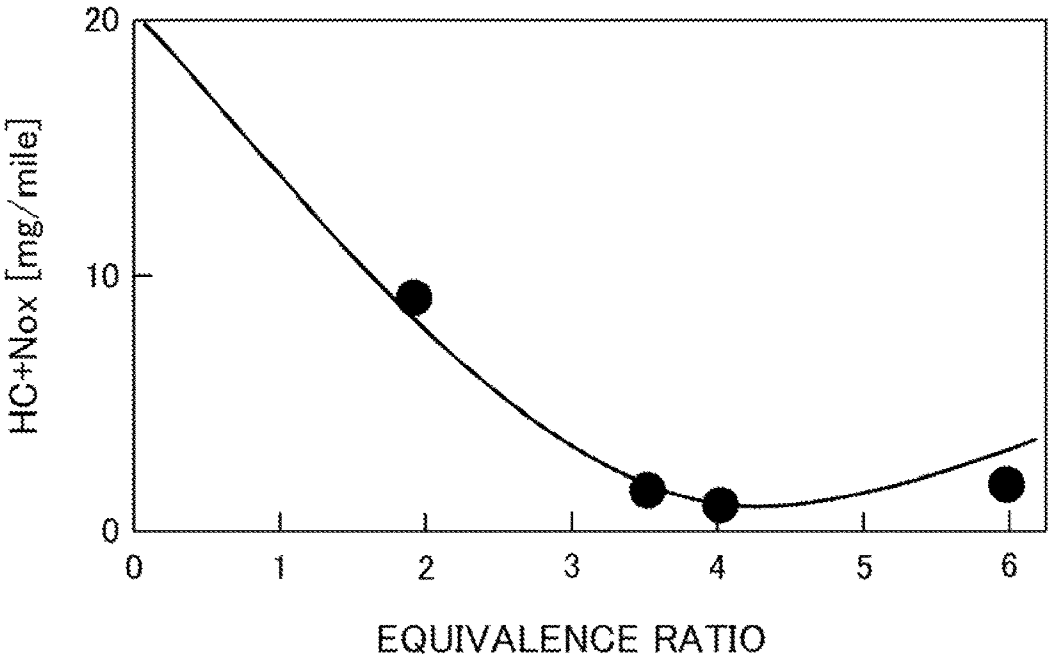
FIG. 2 is a graph showing a relationship between an equivalence ratio and the amount of air pollutants to be emitted at the time of ignition.
Figure 3:
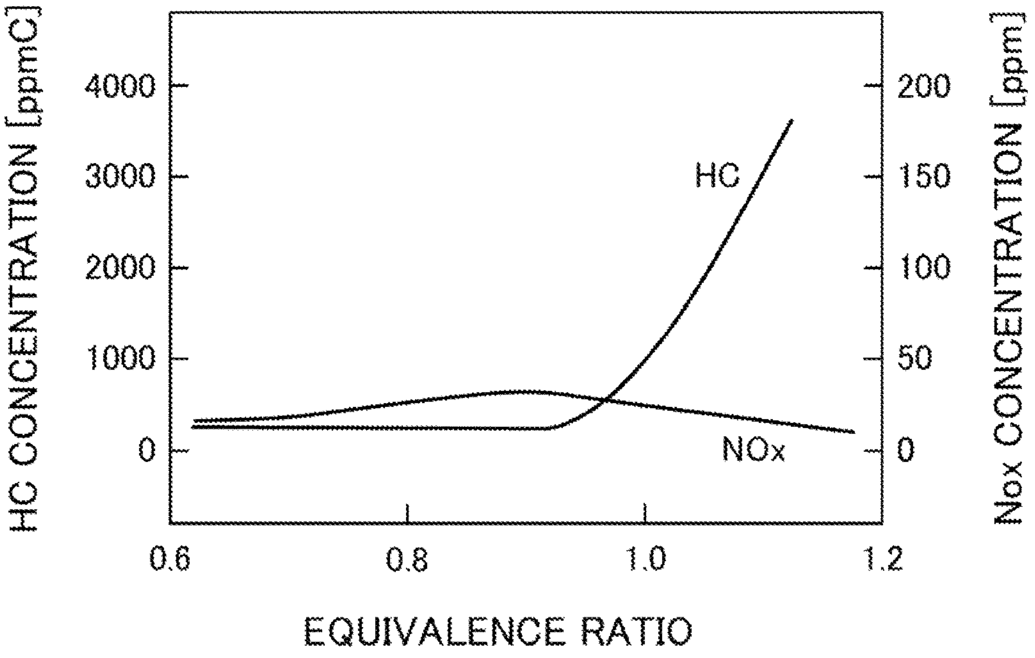
FIG. 3 is a graph showing a relationship between an equivalence ratio and the amount of air pollutants to be emitted at the time of continuous combustion

The equivalence ratio setting unit 131 sets a target value of an equivalence ratio of the air-fuel mixture to a first equivalence ratio larger than 1 until a predetermined first time elapses from the start of the fuel supply, and sets the target value of the equivalence ratio of the air-fuel mixture to a second equivalence ratio smaller than 1 after the first time elapses. As shown in FIG. 2, at the time of ignition of the air-fuel mixture, when the equivalence ratio is made relatively large, the amount of air pollutants to be emitted can be reduced. Further, as shown in FIG. 3, during continuous combustion, when the equivalence ratio is made relatively small, the amount of air pollutants to be emitted can be reduced. For this reason, according to the exhaust gas purification apparatus 1 including the equivalence ratio setting unit 131 that sets the target value of the equivalence ratio as described above, in the catalyst heating treatment, the generation of air pollutants at the time of ignition is reduced by ignition with a rich air-fuel mixture, and the generation of air pollutants is reduced by combustion with a lean air-fuel mixture after the combustion is stabilized. Thus, the exhaust gas purification apparatus 1 can reduce the amount of air pollutants to be emitted in the catalyst heating treatment.

Figure 4:
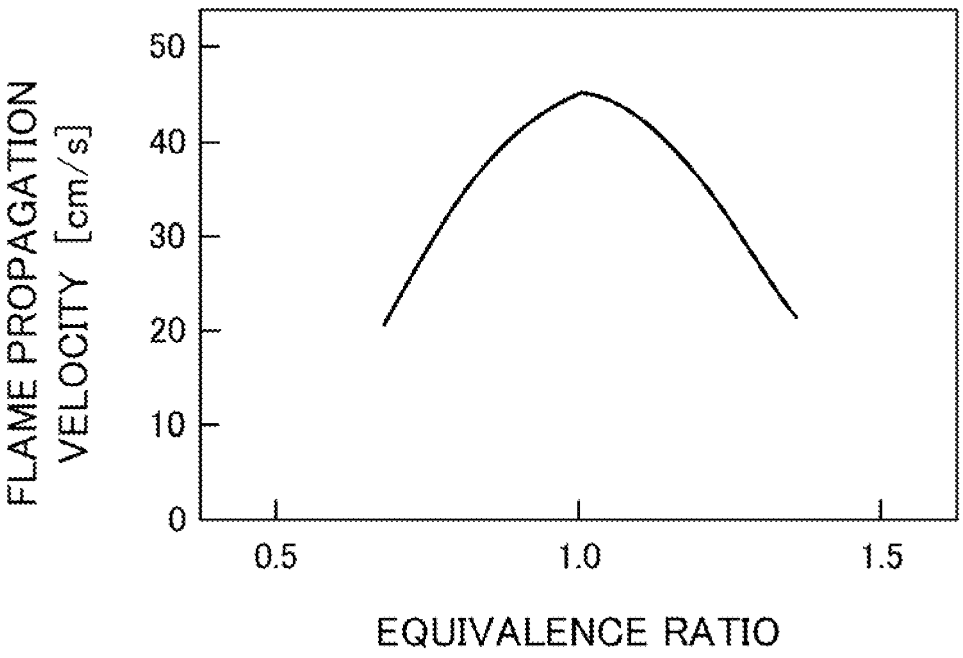
FIG. 4 is a graph showing a relationship between an equivalence ratio and a flame propagation velocity.

It is preferable that the equivalence ratio setting unit 131 sets the target value of the equivalence ratio of the air-fuel mixture to a third equivalence ratio, which is smaller than 1 and larger than the second equivalence ratio, when a predetermined second time elapses from the start of the fuel supply. In other words, the second equivalence ratio is preferably a value that makes the air-fuel mixture relatively more lean, and the third equivalence ratio is preferably a value that makes the air-fuel mixture relatively less lean. At the time of ignition, a rich air-fuel mixture capable of reducing the generation of air pollutants is supplied to the exhaust passage, and after the ignition, the air-fuel mixture being primarily large lean is supplied, thereby the equivalence ratio of the air-fuel mixture in the exhaust passage 241 can be lowered to the extent that the generation of air pollutants can be reduced during the continuous combustion. In addition, as shown in FIG. 4, since a flame propagation velocity is maximized when the equivalence ratio is approximately 1 (stoichiometric), when the second equivalence ratio is set to a large and lean value, it is possible to reduce the flame propagation velocity and prevent misfiring. After an equivalence ratio of unburned air-fuel mixture in the exhaust passage 241 is lowered, a slightly lean air-fuel mixture capable of reducing the generation of air pollutants during the continuous combustion is supplied, and thus stable and low-emission combustion can be continued. In addition, by the control of the equivalence ratio in three stages in this way, it is possible to stabilize the flame and easily continue combustion with only minimum (for example, once) ignition.

More specifically, the second equivalence ratio is preferably an equivalence ratio equal to or lower than a misfiring limit, and the third equivalence ratio is preferably an equivalence ratio equal to or higher than the misfiring limit. When the equivalence ratio is made equal to or lower than the misfiring limit after ignition, the equivalence ratio of the air-fuel mixture in the exhaust passage 241 can be lowered, and thus it is possible to prevent the air-fuel mixture in the exhaust passage 241 from becoming excessively rich in fuel and to prevent misfiring caused by a backflow of flame. Further, after the equivalence ratio of the air-fuel mixture in the exhaust passage is lowered to 1 or less, that is, to stoichiometry or less by the supply of the air-fuel mixture equal to or lower than the misfiring limit, a moderately lean air-fuel mixture equal to or higher than the misfiring limit is supplied, and thus the emission of air pollutants can be effectively reduced.

As specific values of the equivalence ratios, the first equivalence ratio is preferably 3 or larger and 6 or smaller, the second equivalence ratio is preferably smaller than 0.6, and the third equivalence ratio is preferably 0.6 or larger and 0.9 or smaller. When the first equivalence ratio is within the above range, the emission of air pollutants at the time of ignition can be more reliably reduced, and when the second equivalence ratio is within the above range, an excessively rich state of the air-fuel mixture at the time of ignition can be reliably eliminated, and the flame propagation velocity can be greatly reduced, whereby the backflow of the flame into the cylinder can be more reliably prevented. When the third equivalence ratio is within the above range, the emission of air pollutants during continuous combustion after the ignition can be more reliably reduced.

The first time is preferably a time during which the air-fuel mixture set to the first equivalence ratio can reach the exhaust ignition device (a time during which, after the fuel injection device 217 injects the fuel, the injected fuel is thought to reach the exhaust ignition device 12). When the first time is set to such a time, the equivalence ratio can be switched from the first equivalence ratio to the second equivalence ratio at an appropriate timing. In addition, the second time is preferably a time during which the equivalence ratio of the air-fuel mixture at an upstream tip of the flame due to the combustion of the air-fuel mixture can be smaller than 1. When the second time is set to such a time, the equivalence ratio can be switched from the second equivalence ratio to the third equivalence ratio at an appropriate timing.

The motor control unit 132 causes the electric motor 22 to drive the crankshaft 213 of the internal combustion engine 2 during the catalyst heating treatment, thereby supplying combustion air to the exhaust passage 241 through the cylinder 211. The motor control unit 132 can supply combustion air to the exhaust passage 241 by causing the electric motor 22 of the internal combustion engine 2 to operate, thereby sending the combustion air relatively accurately and efficiently to the exhaust passage 241. In addition, since the combustion air is supplied to the exhaust passage 241 using the electric motor 22, there is no need to provide a combustion air supply mechanism for the catalyst heating treatment, whereby the configuration of the device can be simplified.

The throttle control unit 133 sets an opening degree of the throttle valve 232 of the internal combustion engine 2 to a predetermined initial opening degree at the start of the catalyst heating treatment. When the opening degree of the throttle valve 232 is set to a certain opening degree or more, and preferably to an opening degree at which the flow rate of the combustion air is substantially maximized, a negative pressure in the cylinder 211 is reduced, and a moving speed in a backflow direction of the air-fuel mixture is reduced, whereby it is possible to prevent the flame generated by ignition of the air-fuel mixture by the exhaust ignition device 12 from flowing back into the cylinder 211. It is known that a flow velocity of the combustion air depends on operation crank angles of the intake valve 214 and the exhaust valve 215 and the like, but peaks out when the opening degree of the throttle valve 232 is a certain opening degree (for example, about 30%). For this reason, the initial opening degree can be set to an arbitrary opening degree at which the flow velocity of the combustion air is 90% or more of the maximum flow velocity when the operation crank angles of the intake valve 214 and the exhaust valve 215 are equal to each other.

Further, when a predetermined third time elapses from the start of the fuel supply, the throttle control unit 133 preferably sets the opening degree of the throttle valve 232 to a continuous combustion opening degree which is smaller than the initial opening degree and at which the flow rate of the combustion air is equal to or larger than a flow rate at which continuous combustion can be made and is equal to or smaller than a flow rate (consequently the amount of fuel supply) being a combustion amount at which the catalyst is overheated. After the behavior of the flame is stabilized, it is desirable that the flame is less likely to flow back and that overheating of the catalyst device 11 is prevented to reduce a heat load of the catalyst. For this reason, after the third time elapses, it is preferable to reduce the opening degree of the throttle valve 232 and to reduce the flow rate of the combustion air and the amount of fuel supply determined based on the flow rate of the combustion air to be described below, thereby reducing the amount of heat supplied to the catalyst device 11. In order to reduce the heat load on the catalyst at an appropriate timing, therefore, it is preferable that the third time is a time until the flame caused by the combustion of the air-fuel mixture is stabilized from the start of the fuel supply.

The fuel supply amount calculation unit 134 acquires the intake pressure of the internal combustion engine 2, that is, a value detected by the intake pressure sensor 233, and calculates, based on the acquired intake pressure, the amount of fuel supply required to set the equivalence ratio of the air-fuel mixture to the target value. The amount of fuel supply is widely used in the internal combustion engine, and the equivalence ratio can be appropriately controlled with a simple configuration.

The cylinder ignition control unit 135 controls an operation timing of the cylinder ignition device 216 such that the air-fuel mixture is not burned in the cylinder 211. When the cylinder ignition device 216 is operated at a timing at which the air-fuel mixture is not ignited, it is possible to prevent deterioration of the ignition plug of the cylinder ignition device 216 due to carbon deposits during the catalyst heating treatment.

The fuel injection control unit 136 causes the fuel injection device 217 to inject fuel into the cylinder 211 after the cylinder ignition control unit 135 causes the cylinder ignition device 216 to perform an ignition operation. With a simple configuration in which the fuel is supplied into the cylinder 211 after the ignition operation of the cylinder ignition device 216, the air-fuel mixture is generated in the cylinder 211, and the generated air-fuel mixture can be introduced into the exhaust passage 241 without being burned in the cylinder 211.

The intake valve control unit 137 brings a closure timing of the intake valve 214 of the internal combustion engine 2 closer to a bottom dead center at the time of start of the catalyst heating treatment. At a rotational speed of the crankshaft 213 assumed during the catalyst heating treatment, when the closure timing of the intake valve 214 is brought closer to the bottom dead center, charging efficiency of the air taken into the cylinder 211 can be increased. Thus, the negative pressure in the cylinder 211 can be reduced, and the flame caused by the exhaust ignition device 12 can be prevented from flowing back into the cylinder. It is preferable that the intake valve control unit 137 causes the closure timing of the intake valve 214 to move away from the bottom dead center when the predetermined third time elapses from the start of the supply of fuel. Since the backflow of the flame is less likely to occur after the behavior of the flame is stabilized, it is preferable to reduce the flow rate of the air-fuel mixture and prevent overheating of the catalyst by moving the closure timing of the intake valve 214 away from the bottom dead center, thereby preventing shortening of the life of the catalyst.

The exhaust ignition control unit 138 causes the exhaust ignition device 12 to perform an ignition operation, that is, to generate a spark at the time of start of the catalyst heating treatment. In addition, the exhaust ignition control unit 138 causes the exhaust ignition device 12 to stop the ignition operation after the flame is generated by the combustion of the air-fuel mixture. Thus, it is possible to reduce electric power required to operate the ignition device, in addition to the reduction of air pollutants at the time of ignition.

Figure 5:
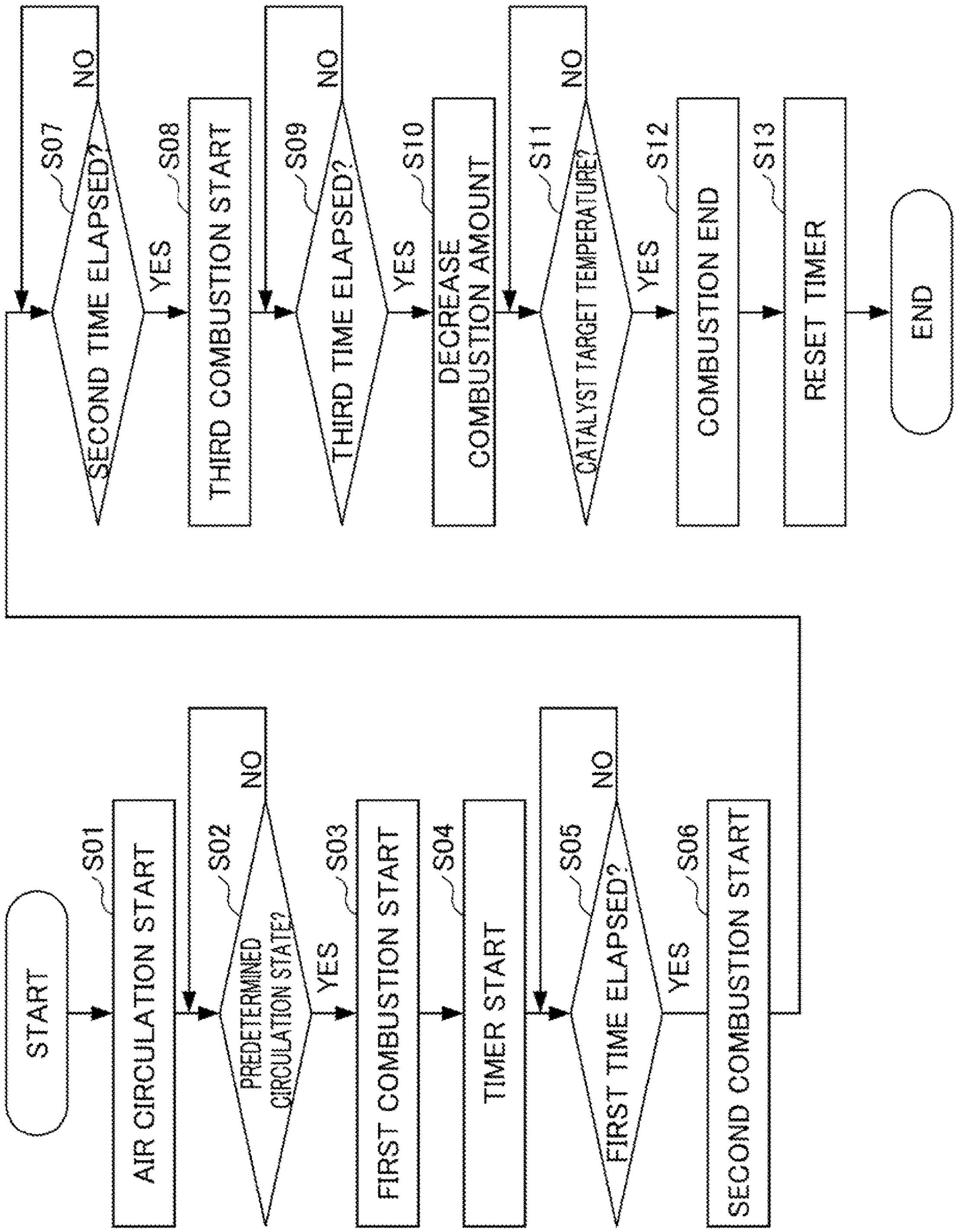
FIG. 5 is a flowchart showing a procedure of a catalyst heating treatment of the exhaust gas purification apparatus shown in FIG. 1.
Figure 6:
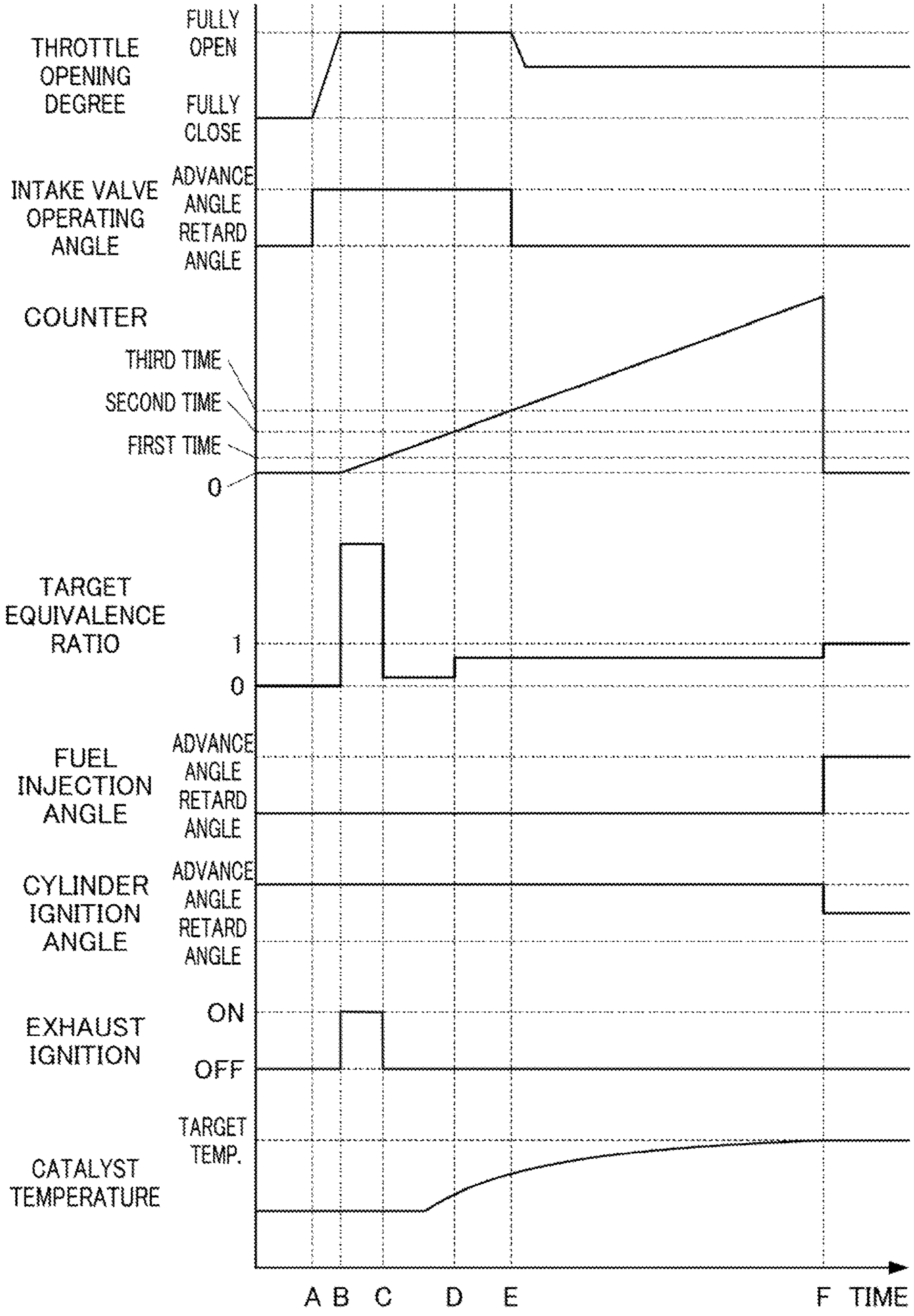
FIG. 6 is a time chart showing operations of each of components in the catalyst heating treatment shown in FIG. 5.

The controller 13 controls the exhaust gas purification apparatus 1 and the internal combustion engine 2 according to procedures shown in a flowchart of FIG. 5 and in a time chart of FIG. 6 to execute a catalyst heating treatment of heating the catalyst device 11 by burning the air-fuel mixture in the exhaust passage 241. The catalyst heating treatment can be executed at the time of cold start, for example, when a value detected by the cooling water temperature sensor 218 is equal to or less than a predetermined value or when a temperature of the catalyst device is equal to or lower than predetermined temperature. At the end of the catalyst heating treatment, the internal combustion engine 2 shifts to a normal operation.

The catalyst heating treatment in the exhaust gas purification apparatus 1 includes an air circulation start step S01, an air circulation state confirmation step S02, a first combustion start step S03, a timer start step S04, a first time confirmation step S05, a second combustion start step S06, a second time confirmation step S07, a third combustion start step S08, a third time confirmation step S09, a combustion amount reduction step S10, a catalyst temperature confirmation step S11, a combustion end step S12, and a timer reset step S13.

In the air circulation start step S01, circulation of combustion air is started. The air circulation start step S01 is executed at time A in FIG. 6. In the air circulation start step S01, the controller 13 drives the crankshaft 213 with the electric motor 22 at a predetermined rotational speed, sets the throttle valve 232 to have a predetermined initial opening degree (for example, fully open), and advances the angle of the crankshaft 213, at which the intake valve 214 is closed, to a predetermined angle so as to approach the bottom dead center.

In the air circulation state confirmation step S02, it is confirmed whether the combustion air is in a predetermined circulation state. Specifically, in the air circulation state confirmation step S02, the controller 13 confirms whether the exhaust ignition device is operated by causing the crankshaft 213 to reach the predetermined rotational speed, setting the throttle valve 232 to have the initial opening degree, and advancing the closing angle of the intake valve 214 to a predetermined angle closer to the bottom dead center. The air circulation state confirmation step S02 is repeated until these conditions are satisfied.

In the first combustion start step S03, the operation of the exhaust ignition device is started, and the combustion of the air-fuel mixture is started at the first equivalence ratio. The first combustion start step S03 is started at time B in FIG. 6. In the first combustion start step S03, the controller 13 confirms an air-intake volume while maintaining the rotational speed of the crankshaft 213, the opening degree of the throttle valve 232, and an operating angle of the intake valve 214, and operates the fuel injection device 217 with a fuel injection quantity that can generate the air-fuel mixture having the first equivalence ratio. At this time, the controller 13 advances the operation crank angle of the cylinder ignition device 216 and retards the operation crank angle of the fuel injection device 217, thereby adjusting the fuel injection device 217 to inject the fuel into the cylinder 211 after the spark generated by the cylinder ignition device 216 disappears. The air-fuel mixture generated in the cylinder 211 in this way is discharged to the exhaust passage 241, and is ignited by the exhaust ignition device 12 to be burned.

In the timer start step S04, the controller 13 starts a timer substantially simultaneously with the first combustion start step S03. Thus, the timer counts the elapsed time from the start of the supply of fuel.

In the first time confirmation step S05, it is confirmed whether the first time has elapsed. In other words, in the first time confirmation step S05, the controller 13 confirms the value of the timer, and determines whether the first time has elapsed from the start of the supply of fuel. The first time confirmation step S05 is repeated until the first time elapses.

In the second combustion start step S06, the combustion of the air-fuel mixture is started at the second equivalence ratio. The second combustion start step S06 is executed at time C (when the first time elapses) in FIG. 6. In the second combustion start step S06, the controller 13 changes only the fuel injection quantity of the fuel injection device 217 from the operating conditions set in the first combustion start step S03 to generate an air-fuel mixture having the second equivalence ratio. This reduces the equivalence ratio of the air-fuel mixture in the exhaust passage 241.

In the second time confirmation step S07, it is confirmed whether the second time has elapsed. In the second time confirmation step S07, the controller 13 determines using the timer whether the second time has elapsed from the start of the supply of fuel. The second time confirmation step S07 is repeated until the second time elapses.

In the third combustion start step S08, the combustion of the air-fuel mixture is started at the third equivalence ratio. The third combustion start step S08 is executed at time D (when the second time elapses) in FIG. 6. In the third combustion start step S08, the controller 13 changes only the fuel injection quantity of the fuel injection device 217 from the operating conditions in the second combustion start step S06 to generate an air-fuel mixture having the third equivalence ratio. Thus, an operating condition is obtained in which the air-fuel mixture can be stably and continuously burned.

In the third time confirmation step S09, it is confirmed whether the third time has elapsed. In the third time confirmation step S09, the controller 13 determines using the timer whether the third time has elapsed from the start of the supply of fuel. The third time confirmation step S09 is repeated until the third time elapses.

In the combustion amount reduction step S10, the flow rate of the air-fuel mixture is decreased. The combustion amount reduction step S10 is executed at time E (when the third time elapses) in FIG. 6. In the combustion amount reduction step S10, the controller 13 sets, from the operating condition in the third combustion start step S08, the opening degree of the throttle valve 232 to a continuous combustion opening degree smaller than the initial opening degree, and retards the closure timing of the intake valve 214 so as to move away from the bottom dead center. Thus, the combustion amount is reduced, and the heat load on the catalyst is reduced.

In the catalyst temperature confirmation step S11, it is confirmed whether the catalyst temperature has reached a target temperature. In the catalyst temperature confirmation step S11, the controller 13 confirms whether the value detected by the catalyst temperature sensor 111 has reached a predetermined target temperature at which it can be determined that the efficiency of the catalyst has been sufficiently improved. The catalyst temperature confirmation step S11 is repeated until the value detected by the catalyst temperature sensor 111 reaches the target temperature.

In the combustion end step 312, the combustion of the air-fuel mixture in the exhaust passage 241 is ended. The combustion end step S12 is executed at time F (a time when the value detected by the catalyst temperature sensor 111 reaches a set temperature) in FIG. 6. In the combustion end step S12, the controller 13 changes various operating conditions to setting for normal operation of the internal combustion engine 2, and ends the catalyst heating treatment.

In the timer reset step S13, the timer is reset. In other words, the controller 13 resets the timer for the next catalyst heating treatment in the timer reset step S13.

As described above, the exhaust gas purification apparatus 1 ignites the rich air-fuel mixture inside the exhaust passage 241 and maintains the combustion state with the lean air-fuel mixture, whereby it is possible to improve the catalytic effect by heating the catalyst device 11 while reducing the emission of air pollutants.

Another Embodiment

In the above-described embodiment, the air-fuel mixture is generated in the cylinder of the internal combustion engine and the generated air-fuel mixture is introduced into the exhaust passage, but a fuel supply device (for example, an injector) may be provided in the exhaust passage to generate the air-fuel mixture in the exhaust passage and an externally generated air-fuel mixture may be introduced upstream of the exhaust ignition device in the exhaust passage. In the above-described embodiment, the configuration of the device and the control method for matching the equivalence ratio to the target value are examples, and can be arbitrarily changed based on the technical knowledge.

EXPLANATION OF REFERENCE NUMERALS

1 exhaust gas purification apparatus
11 catalyst device
111 catalyst temperature sensor
12 exhaust ignition device
13 controller
131 equivalence ratio setting unit
132 motor control unit
133 throttle control unit
134 fuel supply amount calculation unit
135 cylinder ignition control unit
136 fuel injection control unit
137 intake valve control unit
138 exhaust ignition control unit
2 internal combustion engine
211 cylinder
213 crankshaft
214 intake valve
216 cylinder ignition device
217 fuel injection device
22 electric motor
232 throttle valve
233 intake pressure sensor
241 exhaust passage

What is claimed is:

1. An exhaust gas purification apparatus for an internal combustion engine including an exhaust passage, the exhaust gas purification apparatus comprising:

a catalyst device arranged in the exhaust passage, the catalyst device configured to purify exhaust gas of the internal combustion engine;

an exhaust ignition device arranged in the exhaust passage upstream from the catalyst device, the exhaust ignition device configured to ignite an air-fuel mixture in the exhaust passage; and a controller configured to control a catalyst heating treatment of the catalyst device by adjusting (i) a supply of the air-fuel mixture to the exhaust ignition device, and (ii) an ignition of the air-fuel mixture via the exhaust ignition device, the catalyst heating treatment including:

setting a target value of an equivalence ratio of the air-fuel mixture to a first equivalence ratio greater than 1 until a predetermined first time elapses from a start of the supply of the air-fuel mixture, and setting the target value to a second equivalence ratio less than 1 when the first time elapses.

2. The exhaust gas purification apparatus according to claim 1, wherein the catalyst heating treatment further includes setting the target value to a third equivalence ratio between the second equivalence ratio and 1 when a predetermined second time elapses from the start of the supply of the air-fuel mixture.

3. The exhaust gas purification apparatus according to claim 2, wherein the second equivalence ratio is less than a misfiring limit, and the third equivalence ratio is greater than or equal to the misfiring limit.

4. The exhaust gas purification apparatus according to claim 2, wherein the ignition of the air-fuel mixture via the exhaust ignition device lights a flame in the exhaust passage, and wherein the second time corresponds to a time required for the equivalence ratio of the air-fuel mixture at an upstream tip of the flame to decrease from the first equivalence ratio to an equivalence ratio less than 1.

5. The exhaust gas purification apparatus according to claim 2, wherein the third equivalence ratio is at least 0.6 and at most 0.9.

6. The exhaust gas purification apparatus according to claim 1, wherein the first time corresponds to a time required for the supply of the air-fuel mixture to reach the exhaust ignition device.

7. The exhaust gas purification apparatus according to claim 1, wherein the catalyst heating treatment further includes stopping the ignition of the air-fuel mixture via the exhaust ignition device when a flame is lit via a combustion of the air-fuel mixture.

8. The exhaust gas purification apparatus according to claim 1, wherein the catalyst heating treatment further includes:

acquiring an intake air pressure of the internal combustion engine, and calculating a supply amount of fuel required to achieve the target value of the equivalence ratio of the air-fuel mixture based on the acquired intake air pressure.

9. The exhaust gas purification apparatus according to claim 1, wherein the catalyst heating treatment further includes driving a crankshaft of the internal combustion engine via an electric motor so as to supply the air-fuel mixture to the exhaust passage through a cylinder of the internal combustion engine.

10. The exhaust gas purification apparatus according to claim 9, wherein the catalyst heating treatment further includes controlling an ignition timing of a cylinder ignition device of the internal combustion engine such that the air-fuel mixture is not burned in the cylinder.

11. The exhaust gas purification apparatus according to claim 10, wherein the catalyst heating treatment further includes injecting fuel into the cylinder via a fuel injection device of the internal combustion engine after the cylinder ignition device performs an ignition operation.

12. The exhaust gas purification apparatus according to claim 9, wherein the catalyst heating treatment further includes injecting fuel into the cylinder via a fuel injection device of the internal combustion engine after a cylinder ignition device of the internal combustion engine performs an ignition operation.

13. The exhaust gas purification apparatus according to claim 1, wherein the catalyst heating treatment further includes setting an opening degree of a throttle valve of the internal combustion engine to a predetermined initial opening degree at a start of the catalyst heating treatment.

14. The exhaust gas purification apparatus according to claim 13, wherein the opening degree of the throttle valve is decreased from the initial opening degree when a predetermined third time elapses from the start of the supply of the air-fuel mixture.

15. The exhaust gas purification apparatus according to claim 14, wherein the ignition of the air-fuel mixture via the exhaust ignition device lights a flame in the exhaust passage, and wherein the third time corresponds to a time required for the flame to stabilize from the start of the supply of the air-fuel mixture.

16. The exhaust gas purification apparatus according to claim 1, wherein the catalyst heating treatment further includes advancing a closure timing of an intake valve of the internal combustion engine closer to a bottom dead center position of a piston of the internal combustion engine at a start of the catalyst heating treatment.

17. The exhaust gas purification apparatus according to claim 16, wherein the catalyst heating treatment further includes retarding the closure timing of the intake valve away from the bottom dead center position when a predetermined third time elapses from the start of the supply of the air-fuel mixture.

18. The exhaust gas purification apparatus according to claim 1, wherein the first equivalence ratio is at least 3 and at most 6.

19. The exhaust gas purification apparatus according to claim 1, wherein the second equivalence ratio is less than 0.6.

* * * * *